Patented July 13, 1937

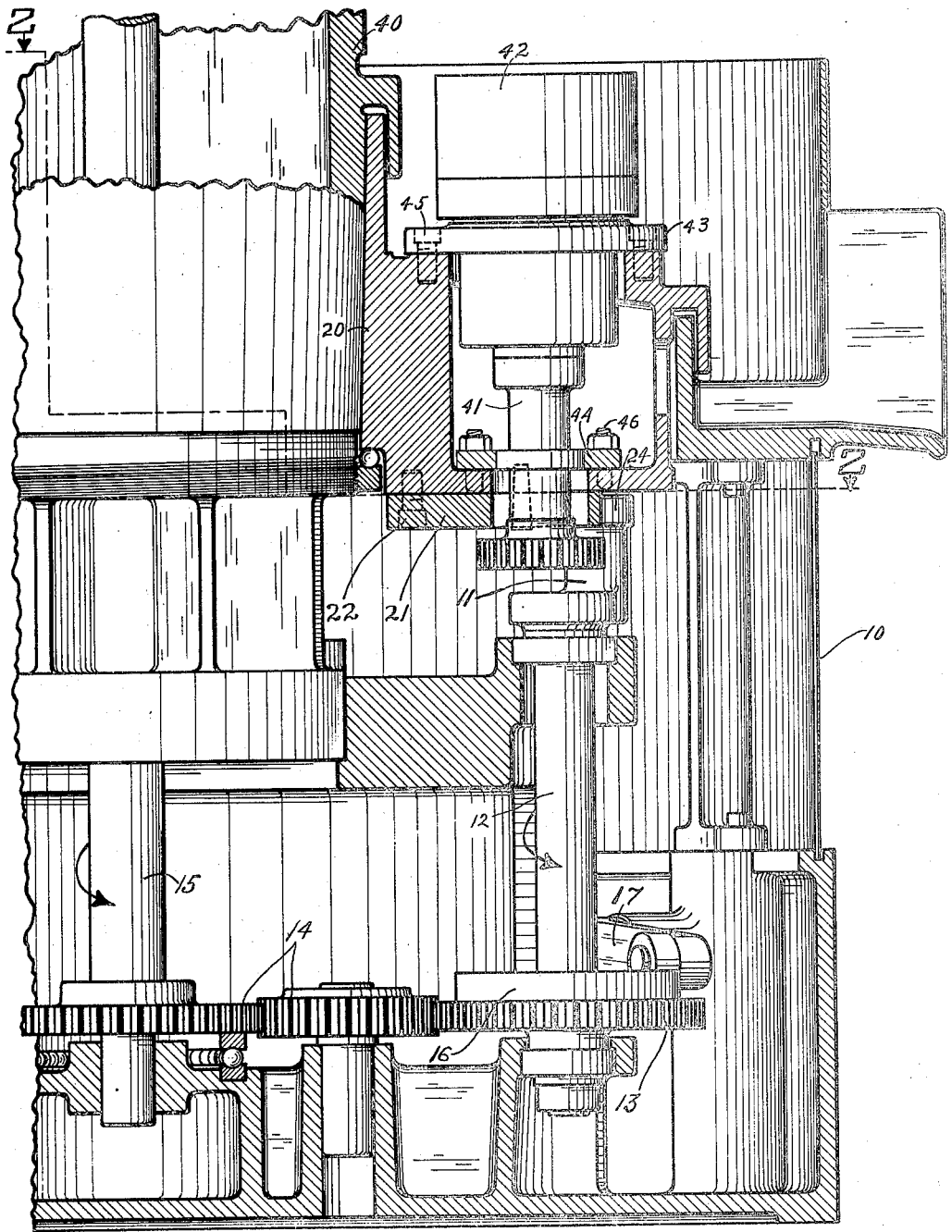

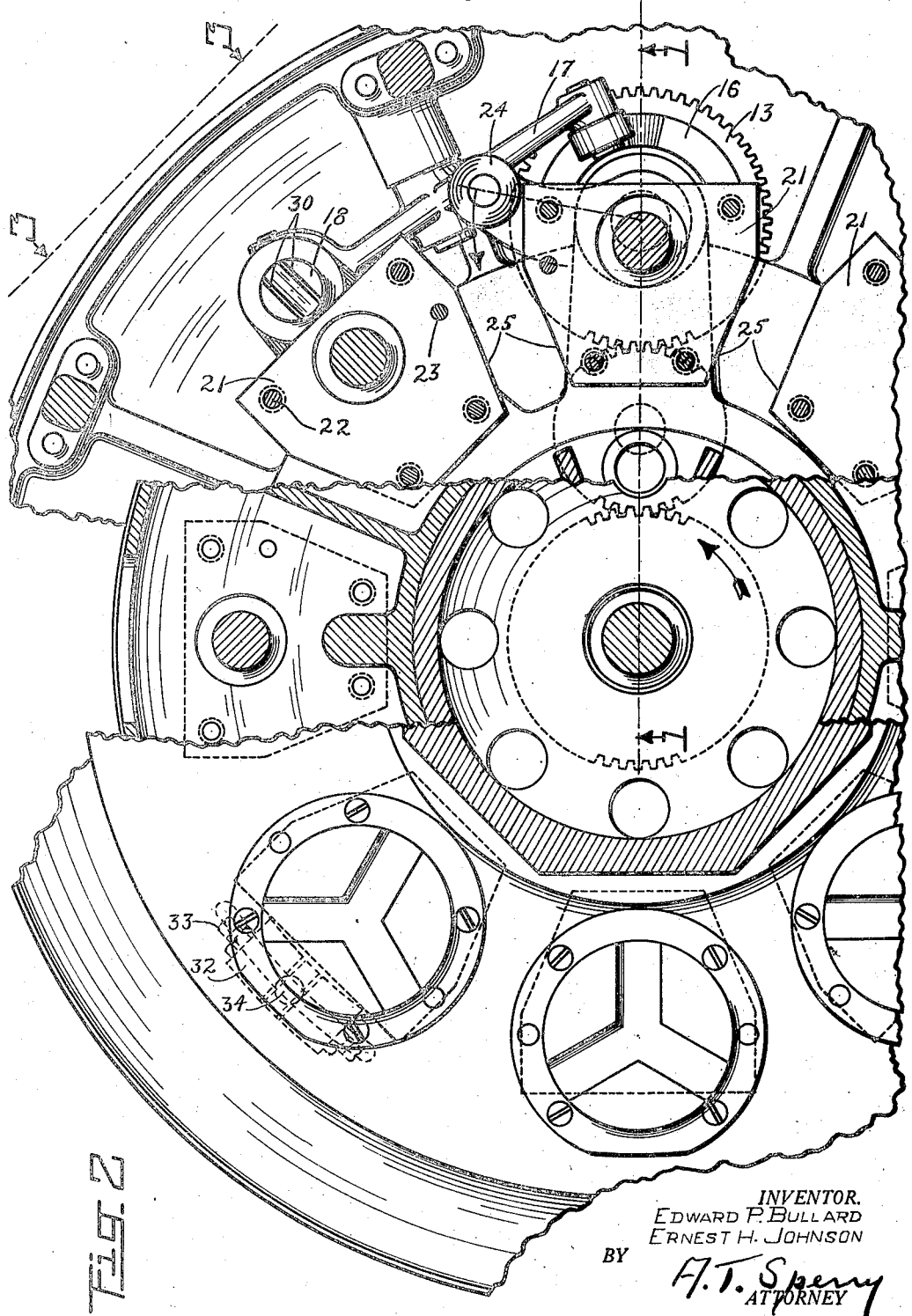

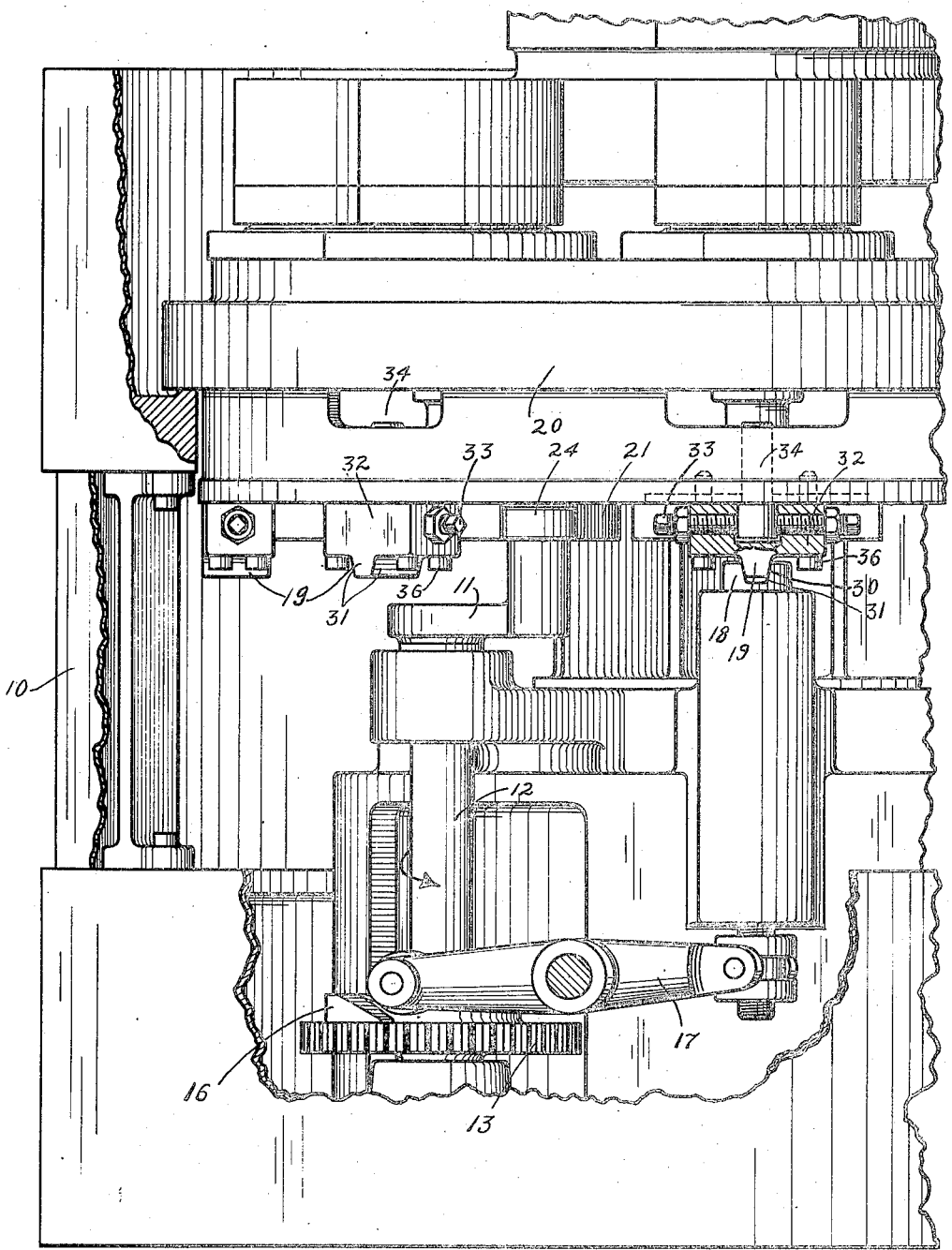

2,086,849

UNITED STATES PATENT OFFICE 2,086,849

CARRIER MECHANISM

Edward P. Bullard, Fairfield, and Ernest H. Johnson, Bridgeport, Conn., assignors to The Bullard Company, a corporation of Connecticut Application September 5, 1935, Serial No. 39,234

19 Claims. (Cl. 29—50)

This invention relates to carrier mechanisms and particularly to means for coordinating the relationship of parts to establish, or alter, the positions to which indexable members of machine tools are moved and locked in the operation thereof.

While the invention is applicable to indexing mechanisms generally, it is particularly adapted for use in connection with the indexing mechanism of multiple operation machine tools of the type in which the work is moved from one position, or station, to another by a rotatable, or indexable, carrier. That form of the invention hereafter described in detail is particularly adapted for use with machine tools of the type described in the application for Machine tool, Serial No. 108,494, filed October 30, 1936. In such constructions, the invention may be employed for initially establishing the positions to which the carrier and work are moved and locked in each indexing operation, and it may also be employed for correcting, or adjusting, the movements of the parts as necessary to compensate for wear, warping or improper movement of the parts after the machine has been assembled and used for some time.

The invention is concerned not only with the specific indexing structure but also with the associated parts and relates, as well, to the combination and coordination of such parts. For a consideration of this aspect of the invention, reference may, therefore, be had to the E. P. Bullard patent, No. 1,970,276, dated August 14, 1934, and to the companion application for Machine tool spindle lubrication, Serial No. 130,111, filed March 10, 1937.

One of the objects of the invention is to provide an improved construction for insuring the desired movement and positioning of an indexable element of a machine tool.

Another object of the invention is to provide means for initially and accurately establishing the positions to which indexable elements of a multiple station machine tool are moved.

A further object of the invention is to provide means for adjusting the mechanism to compensate for wear, warping or other factors which may cause changes in the operation of the machine as occur when in use.

Another object of the invention is to provide a novel combination of cooperating means for insuring accuracy in the movement and positioning of an indexable member of a multiple station machine tool.

A further object is to provide for individual establishment, or adjustment, of various related parts such that spindle position may be established, or adjusted, with respect to index movement establishment, or adjustment, and/or with lock pin establishment, or adjustment, and/or lock pin and indexing may be established and adjusted independently of spindle or any of these elements may be established independently of the others, such independence extending between the elements of the groups as well as between the groups as a unit.

Thus it will be seen that the invention has among its objects not only to provide a novel, simple and efficient indexing structure but also to provide great flexibility of establishment and adjustment of coordinating parts.

These and other objects and features of the invention will appear from the following description thereof in which reference is made to the accompanying figures of the drawings which illustrate a typical embodiment of the invention as applied to a machine tool of the type herein referred to.

In the drawings:

Figure 1 is a vertical sectional view of a machine tool embodying a typical form of the present invention, taken on the line 1—1 of Figure 2.

Figure 2 is a horizontal sectional view of the construction illustrated in Figure 1 taken on the line 2—2; and Figure 3 is a view in elevation of a portion of the construction illustrated in Figures 1 and 2 with certain parts thereof broken away.

The form of machine tool, to which the invention is applied in the construction hereafter more fully described and illustrated in the drawings, embodies an indexing mechanism shown as in the form of a rotatable crank. The crank may be driven from any suitable source of power, and is adapted to move in a circular path to engage each of a plurality of spaced indexing plates so that the table is given a Geneva motion to provide movement from station to station about the machine.

Indexing plates, formed separately from the carrier, are secured to the lower face thereof by bolts, dowels, or the like, in positions which determine the location of the carrier and the work at the end of each indexing movement, the desired positions of the indexing plates being established when the machine is assembled so as to insure accurate movement of the table despite inaccuracies in the construction, or machining, of the table or index drive means. Thereafter, if necessary, the plates may be removed and relocated to correct, or reestablish, the desired movement of the table or to compensate for wear, warping or other factors which may cause the movement to change after the machine has been used for some time. This establishment, or adjustment, of the indexing movement may be made either independently or in conjunction with complementary establishment, or adjustments, of cooperating locking and positioning means of the type described in the copending application Serial No. 36,459, filed August 16, 1935, referred to above and/or in conjunction with work spindle establishment, or adjustment, as shown in the patent, No. 1,970,276, above referred to.

By reference to the companion application and the prior patent, it will be noted that the work holding spindles, or fixtures, may be adjusted in the carrier and that the lock pin receiving bits may be adjusted on the carrier, each spindle and each bit being capable of independent adjustment. Thus, in the assembly of the machine or in subsequent adjustment thereof for each station, any one, or all three, or any two of these elements may be adjusted to their desired position without requiring new machining of parts or replacement thereof.

Referring to the drawings, the invention, as illustrated, is applied to a vertical, multiple spindle machine tool having a base 10 within which is located an indexing crank arm 11 rotated by a shaft 12 and gear 13 through gears 14 from a centrally located drive shaft 15. The gear 13 on the shaft 12 is also provided with a lock pin operating cam 16 which actuates a lever 17 to retract lock pin 18 from lock pin bits 19 on the lower face of a spindle carrier 20. These elements serve to release the carrier for an indexing movement at the completion of a machining operation and to relock the same thereafter as more fully described in said copending application, Serial No. 36,459, filed August 16, 1935, and hereafter.

The annular carrier 20, which is mounted for rotation about a central column 40, is provided with work holders which chuck the work and hold it for successive operations thereon at the various working stations. Obviously, various kinds of holders may be employed, such as non-rotatable fixtures, and these may be adjustable in the carrier as are rotatable work holding spindles 41 which are shown by way of illustration. These spindles have heads 42 carrying chuck jaws and are loosely mounted through apertures in the carrier and are secured thereto by head and tail plates 43 and 44 which are bolted to the spaced flanges of the carrier. Thus, for original location, or subsequent adjustment, spindle securing bolts 45 and 46 may be removed, the plates adjusted and the bolts again secured as shown in Patent No. 1,970,276. Such adjustment may be individual for each spindle and may, or may not, be accompanied by adjustment of the lock pin bits or the indexing plates.

The spindle carrier 20 is also provided with spaced indexing plates 21 formed separately from the carrier and secured to the lower face thereof by bolts 22 and dowels 23 in positions to be engaged by a head 24 of the indexing crank arm 11 as it rotates. Faces 25 of the plate extend substantially radially and tangential to the path of movement of the head 24 of the crank so that the head approaches the plates gradually, as it passes inwardly, in its rotation as shown by the arrow in Figure 2 and causes the carrier to be moved slowly at first, increasing to a maximum speed, and finally to approach its new position slowly as the head of the crank arm passes outward along the face 25 of the plate after indexing the carrier.

The position of the indexing plates 21 and the faces 25 thereof determines the locations of the carrier at the end of the indexing movements. Therefore, accurate positioning of the plates insures similar accurate indexing movement of the carrier. This positioning of the carrier can be established when the machine is assembled by determining the positions of the indexing plates which will insure the desired movement of the carrier. The under face of the carrier is then drilled and tapped accordingly and the bolts 22 and dowel 23 are inserted to fix the plates in the positions determined. Thereafter, if warping, or wear, of the carrier, or other elements of the machine, should occur, or the plates should be dislocated, or repositioning of the elements should be desirable for any other reason, the indexing plates may be removed and relocated to correct the movements or reestablish those movements initially provided as desired without disassembling the whole machine, or remachining, or replacing, the whole carrier.

When the machine is in use, it is desirable to lock the carrier against movement in each of the positions to which it is moved by the indexing operations in order that operations on the work may be accurately performed. For this purpose, the lock pin 18 and lock pin bits 19 are provided and as described in said copending application, Serial No. 36,459 filed August 16, 1935, they are preferably formed with cooperating cam surfaces 30 and 31 on the lock pin and bits respectively for the purpose of providing limited additional movement of the carrier to position the carrier more accurately and retain the same in place. Adjustment of the positions of the lock pin bits, with reference to the carrier, is effected by adjusting positioning blocks 32 by means of screws 33 carried by the blocks and engaging a fixed pin 34 on the carrier. The blocks are secured to the carrier in their adjusted positions by bolts, or pins, 36 to prevent displacement of the blocks and bits in use.

The initial positioning of the indexing plates and subsequent adjustments thereof may be accompanied by corresponding adjustments of the lock pin bits and/or the spindles so that accurate, or corrected, movements of the carrier during the indexing operations will be supplemented by accurate locking and positioning of the spindles during the subsequent and intervening machining operations.

The indexing, locking and positioning operations of the carrier and associated mechanisms of a machine tool, or of other indexable elements of machines having like movements, are thus rendered variable to insure accuracy and uniformity by changes, or variations, in the relative positions of the indexing and locking devices and spindles with respect to the indexable element of the machine. The form and arrangement of the members employed for attaining these advantages and flexibility of construction and operation have been herein shown and described in typical relations and forms for use with machine tools of the type described in the copending application Serial No. 108,494, filed October 30, 1936, referred to above. However, the invention is equally applicable to other types of machine tools and to other indexable elements of mechanisms having the same or similar movements.

In view thereof, it should be understood that the invention is not limited to the form illustrated or to its use in the relation described, but contemplates other forms and relations of the elements thereof to adapt the same for other uses and combinations within the scope of the appended claims.

Having thus set forth the nature of our invention, what we claim is:

1. A multiple spindle machine tool having a spindle carrier indexable to move the spindles from a loading station to each of a plurality of work stations, spaced indexing plates secured to the lower face of said spindle carrier, an indexing crank rotatable to move into and out of the spaces between said plates and engage each plate in turn to index said carrier with a Geneva motion, and removable bolts passing through said plates into the carrier to secure the plates thereto in adjusted positions.

2. In a machine tool having an indexable table, a rotatable crank arm, a plurality of spaced indexing plates secured to said table in positions to permit the passage of the crank arm into and out of the spaces between the same and presenting surfaces to be engaged by said crank arm lying substantially tangential to the path of movement thereof to cause said table to be indexed from one position to another in a Geneva motion and removable bolts extending through said plates and into said table to secure the plates to the table in adjusted positions thereon.

3. In a machine tool, a work carrier movable from one position to another, an indexing member secured to said carrier and movable therewith, indexing drive means movable to engage said member to move said carrier, means for securing said member to said carrier in adjusted position thereon, locking elements for holding said carrier against displacement after movement thereof by said drive means and means for adjusting the relative positions of said member and drive means.

4. In a machine tool, a work carrier movable from one position to another, an indexing member secured to said carrier and movable therewith, indexing drive means movable to engage said member to move said carrier, means for securing said member to said carrier in adjusted position thereon, locking elements for holding said carrier against displacement after movement thereof by said drive means and means for adjusting the relative positions of said locking elements.

5. In a machine tool, a work carrier movable from one position to another, an indexing member secured to said carrier and movable therewith, indexing drive means movable to engage said member to move said carrier, means for securing said member to said carrier in adjusted position thereon, locking elements for holding said carrier against displacement after movement thereof by said drive means and means for adjusting the relative positions of said member and said locking means.

6. In a machine tool, an indexable table, indexing members secured to said table in spaced relation, indexing drive means movable to engage each of said members in turn to index said table, means for securing said members to said table in adjusted positions thereon, locking and positioning elements one of which is movable to engage the other to hold said table against displacement and means for altering the relative positions of said elements.

7. In an indexing mechanism, the combination with a carrier adapted to be indexed, a periodically moving member for applying an indexing impulse thereto, a lock pin for securing said member in an indexed position, means for varying the locking relation between said carrier and lock pin and means for varying the indexed movement of said carrier in response to said periodically moving member.

8. A multiple spindle machine tool having a spindle carrier movable to transfer the spindles from a loading station to each of a plurality of work stations, spaced indexing plates secured to the lower face of said spindle carrier, an indexing crank rotatable to move into and out of the spaces between said plates and engage each plate in turn to index said carrier with a Geneva motion, securing means for attaching said plates to the carrier in adjusted positions thereon, adjustable positioning means on the carrier and a lock pin for engaging the same to retain said carrier in position after indexing thereof.

9. A machine tool having a work moving carrier indexable from one position to another, a rotatable crank for indexing said carrier, drive means for said crank, indexing members secured to the carrier in positions to be engaged by said drive means, securing means for attaching said indexing members to the carrier in adjusted positions, lock pin bolts also adjustably secured to said carrier and a lock pin presenting a cam surface and means actuated by the drive means for said crank for moving said lock pin into engagement with said lock pin bits upon completion of an indexing operation to position the carrier accurately and prevent displacement thereof.

10. In a machine tool having an indexable table, a crank arm, drive means for rotating the same, a plurality of spaced indexing plates secured to said table in positions to permit the passage of the crank arm into and out of the spaces between the same and presenting surfaces to be engaged by said crank arm lying substantially tangential to the path of movement thereof to cause said table to be indexed from one position to another in a Geneva motion, removable bolts passing through said plates and entering said table for attaching said plates to said table in adjusted positions thereon and locking means actuated by the drive means for said crank arm for retaining the table against displacement upon the completion of an indexing movement.

11. In an indexing mechanism, the combination of a carrier having work holding fixtures of an indexing mechanism for said carrier, means for adjusting the position of said work holding fixtures with respect to said carrier and means for varying the indexing movement of said carrier.

12. In an indexable carrier having work holding fixtures mounted thereon, the combination with a lock pin for securing said carrier in locked positions and means for varying the relationship between said work holding fixtures and said lock pin.

13. In an indexable carrier having work holding fixtures mounted thereon, the combination with a lock pin for securing said carrier in locked positions and means for varying the relationship between said work holding fixtures and said lock pin, said means comprising means for adjusting the relationship of said work holding fixtures to said carrier.

14. In an indexable carrier having work holding fixtures mounted thereon, the combination with a lock pin for securing said carrier in locked positions and means for varying the relationship between said work holding fixtures and said lock pin, said means comprising means for adjusting the relationship of the lock pin with respect to the work holding fixtures.

15. In an indexable carrier having work holding fixtures mounted thereon, the combination with a lock pin for securing said carrier in locked positions and means for varying the relationship between said work holding fixtures and said lock pin, said means comprising means for adjusting both the lock pins with respect to the carrier and the work holding fixtures with respect to the carrier.

16. In an indexing mechanism, the combination with an indexing carrier, adjustable means for periodically indexing the same, work holding fixtures carried thereby and individually adjusted thereon and locking means for securing the carrier in locked position, said means being individually adjusted with respect to the carrier.

17. In a carrier mechanism, the combination with a carrier to be indexed, means for indexing the same, work holding fixtures on said carrier, a locking means for said carrier to secure the same in indexed position and means for individually adjusting the indexing movement.

18. In a carrier mechanism, the combination with a carrier to be indexed, means for indexing the same, work holding fixtures on said carrier, a locking means for said carrier to secure the same in indexed position and means for individually adjusting the indexing movement and the engaged relation of the locking means.

19. In a carrier mechanism, the combination with a carrier to be indexed, means for indexing the same, work holding fixtures on said carrier, a locking means for said carrier to secure the same in indexed position, means for adjusting the indexing movement individually for each indexing step and means for adjusting therewith both the locking mechanism and the position of the fixtures in the carrier.

EDWARD P. BULLARD.
ERNEST H. JOHNSON.